US012565286B2

(12) United States Patent
Yao

(10) Patent No.: US 12,565,286 B2
(45) Date of Patent: Mar. 3, 2026

(54) POWER-OUTPUT WIRELESS TORQUE DETECTION MECHANISM AND BICYCLE USING SAME

(71) Applicant: Li-Ho Yao, Taipei (TW)

(72) Inventor: Li-Ho Yao, Taipei (TW)

( * ) Notice: Subject to any disclaimer, the term of this patent is extended or adjusted under 35 U.S.C. 154(b) by 672 days.

(21) Appl. No.: 18/094,394

(22) Filed: Jan. 9, 2023

(65) Prior Publication Data

US 2023/0227122 A1 Jul. 20, 2023

(30) Foreign Application Priority Data

Jan. 17, 2022 (TW) ................................. 111200610

(51) Int. Cl.
*B62M 6/50* (2010.01)

(52) U.S. Cl.
CPC ...................................... *B62M 6/50* (2013.01)

(58) Field of Classification Search
CPC ................................... B62M 6/50; B62M 6/55
See application file for complete search history.

(56) References Cited

U.S. PATENT DOCUMENTS

| | | | | |
|---|---|---|---|---|
| 6,163,148 A | * | 12/2000 | Takada | G01L 3/105 |
| | | | | 324/226 |
| 8,825,279 B2 | * | 9/2014 | Kitamura | B62J 45/411 |
| | | | | 701/33.1 |
| 10,758,765 B2 | * | 9/2020 | Smith | A63B 22/0664 |
| 2014/0074348 A1 | * | 3/2014 | Kitamura | B62M 6/50 |
| | | | | 701/33.1 |
| 2019/0201730 A1 | * | 7/2019 | Smith | A63B 21/22 |
| 2021/0269118 A1 | * | 9/2021 | Nishimori | H02K 9/223 |
| 2021/0405082 A1 | * | 12/2021 | Hahn | G01P 3/487 |
| 2022/0009588 A1 | * | 1/2022 | Kawakami | B62J 45/411 |
| 2022/0281553 A1 | * | 9/2022 | Hahn | B62M 6/50 |

* cited by examiner

*Primary Examiner* — Valentin Neacsu
*Assistant Examiner* — Michael R Stabley
(74) *Attorney, Agent, or Firm* — Leong C. Lei

(57) ABSTRACT

Disclosed is a power-output wireless torque detection mechanism, which includes an input assembly and an output assembly that is driven by the input assembly separately mounted on a fixed body. A wireless detection device is arranged between the input assembly and the output assembly, so that the wireless detection device is operable to detect a rotating torque value and a rotating speed value that are transmittable in a wireless manner. As such, a modularized arrangement is formed, which exhibits bettered universality and enhances accuracy of torque detection and also improves stabilization and correctness of signal transmission to allow a subsequent input of an assisting power to be conducted in a more timely and more accurate manner and to achieve an effect of easy assembling and servicing, and also to reduce an overall cost.

7 Claims, 5 Drawing Sheets

POWER-OUTPUT WIRELESS TORQUE DETECTION MECHANISM AND BICYCLE USING SAME

TECHNICAL FIELD OF THE INVENTION

The present invention relates generally to technology of torque detection for power output.

DESCRIPTION OF THE PRIOR ART

In an existing assisted bicycle, a known torque detection mechanism that is used to detect whether or not an input of an assisting power is necessary generally comprises a strain gauge attached to a surface of a crank axle. When two crankarms respectively on the left and right sides are treaded down, the crank axle receives a torque and gets deformed. The stain gauge detects the strain of the crank axle and a wireless transmission signal is applied, as being received by a receiver, to control an output power of an assisting motor so as to achieve an effect of assisting the rider for saving labor.

In such a structure, however, electrical power is necessary for the wireless transmission device. Generally, a battery set is used for supply of electrical power to the wireless transmission device, yet the battery set will gradually run out of power over time, leading to deterioration of signals of the wireless transmission device from which interference or instability may result. This in turn affects the output of the assisting power. For example, when a value of torque received is lessened due to incorrectness of wireless transmission, failure of effective and timely supply of a desired assisting power may result, and oppositely, when the value of torque received is excessively enlarged due to incorrectness of wireless transmission, an excessive output of the assisting power may result, leading to an issue of unexpected rushing caused by the excessively enlarged assisting power, all making the vehicle not operating smoothly and developing a phenomenon of delaying feedback, which results in an issue that the assisting power is not generated accurately in time.

Further, an existing wireless transmission device is arranged inside a power output shaft. This requires the power output shaft to be completely disassembled for both assembling and replacement of the battery, or servicing. This is inevitably a trouble and wastes time. Further, the components have to be assembled together one by one, and inaccuracy may be induced due to assembling problems, leading to influence on a subsequent operation of torque detection. Consequently, there may be issues of difficulty of assembling and servicing. This inevitably increases the overall cost. Thus, the present invention is made to overcome such deficiencies.

SUMMARY OF THE INVENTION

The primary objective of the present invention is to realize an effect of wireless power supply and accurate detection of torque, and enabling stable and effective transmission of a detection signal of a torque value in a wireless manner to avoid noise interference or incorrectness resulting from signal deterioration during the wireless transmission of the torque value.

Another objective of the present invention is to realize, by means of a modularized structure, enhanced universality for easy assembling and servicing, and requiring no battery replacement, so as to not only ensure correctness of signal transmission but also achieve an effect of easy assembling and servicing to thereby reduce, in an insensible way, the costs of assembling and servicing.

A further objective of the present invention is to provide a bicycle that uses the invention to detect a variation value of a torque of a rotating axle for reliable and accurate output in a wireless manner to allow a subsequent input of an assisting power to be conducted in a more timely and more accurate manner to thereby avoid situations of delayed movement or rushing movement.

DETAILED DESCRIPTION OF THE PREFERRED EMBODIMENT

Figure 1:
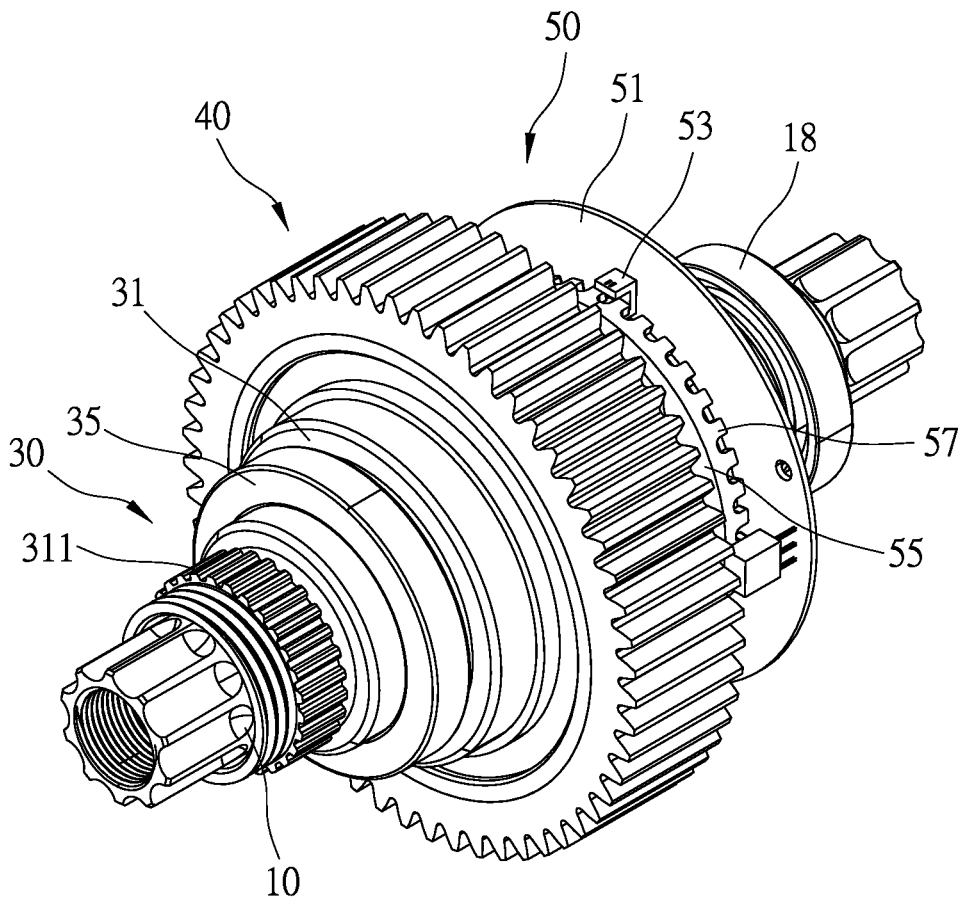
FIG. 1 is a perspective view of the present invention.

The present invention provides a power-output wireless torque detection mechanism, which, as shown in FIG. 1, is structured as comprising an input shaft 10, an output assembly 30, an assisting power assembly 40, and a wireless detection device 50, wherein the input shaft 10 and the assisting power assembly 40 are operable for separately performing driving output to the output assembly 30 for separately or jointly driving a driven body (not shown in the drawings), such as a power-assisted bicycle. The feature of the present invention is the wireless detection device 50 mounted on the input shaft 10 to precisely detect a rotating torque value and a rotating speed value and to perform accurate and timely transmission in a wireless manner.

Figure 2:
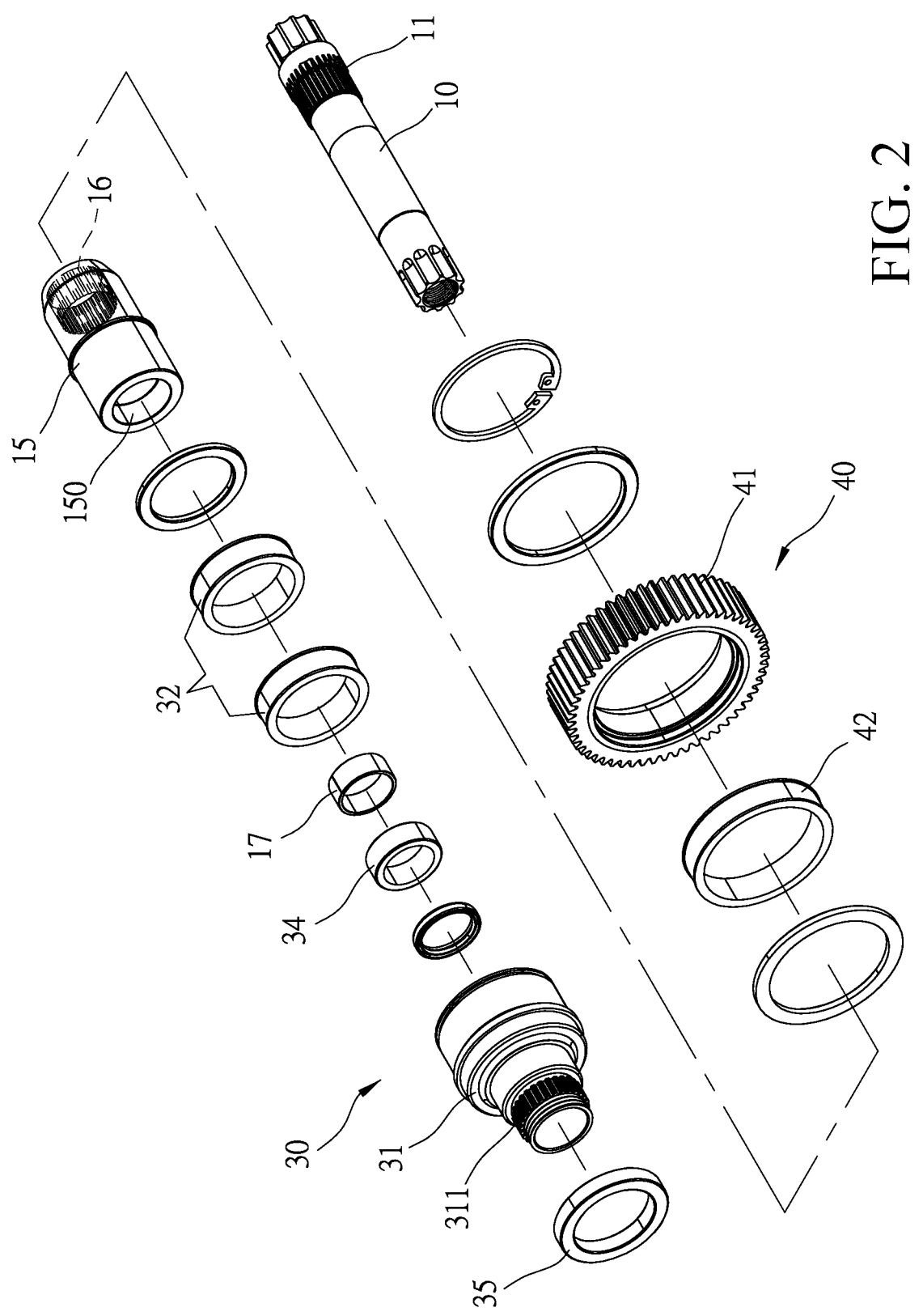
FIG. 2 is an exploded view showing an output assembly of the present invention.
Figure 3:
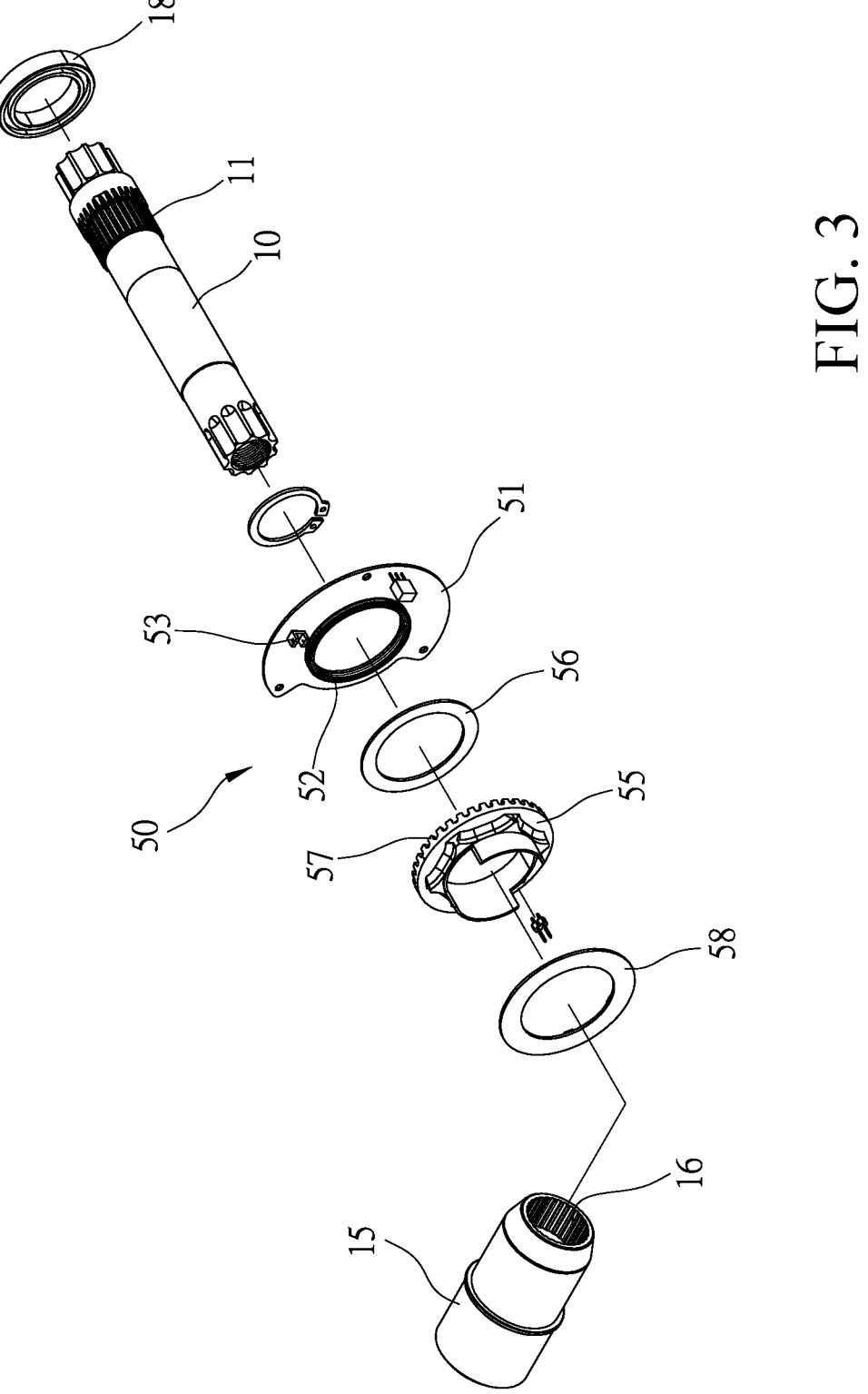
FIG. 3 is an exploded view showing a wireless detection device of the present invention.
Figure 4:
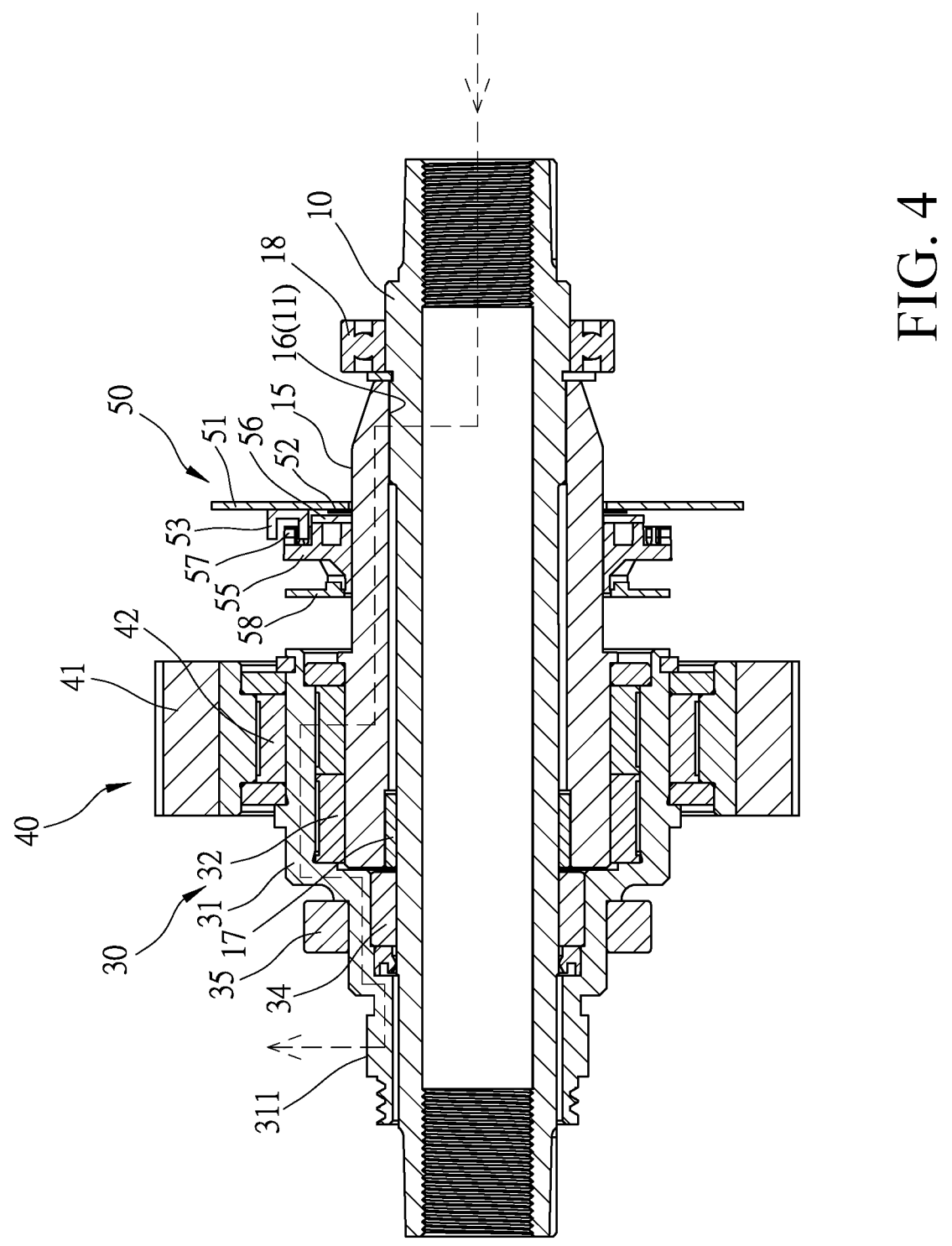
FIG. 4 is a cross-sectional view showing operation with primary power according to the present invention.

A detailed structure of the power-output wireless torque detection mechanism is illustrated in FIGS. 2, 3, and 4. The input shaft 10 is caused, by means of an input of a primary power to at least one of two opposite ends thereof, to rotate about a central axis thereof. For example, the input shaft 10 can be a crank axle of the power-assisted bicycle, and the crank axle is caused to move by pedaling crank arms mounted to two ends thereof so as to drive a sprocket mounted on the crank axle to generate an output to drive a chain to drive the power-assisted bicycle. An engagement toothed section 11 is formed on an end of the input shaft 10, and a detection sleeve 15 is fit over and sleeved around the input shaft 10. The detection sleeve 15 is formed with an axial hole 150, and an end of the axial hole 150 of the detection sleeve 15 that corresponds to the engagement toothed section 11 of the input shaft 10 is formed with a counterpart engagement toothed section 16, so that the detection sleeve 15 is set in meshing engagement with the input shaft 10 to be synchronously rotatable therewith. Further, a bearing 17 is arranged between an opposite end of the axial hole 150 of the detection sleeve 15 and the input shaft 10 to allow the detection sleeve 15 to reflect a torque value between the input shaft 10 and the output assembly 30. Further, one side of the input shaft 10 that is opposite to the bearing 17 of the detection sleeve 15 is provided with a first outside bearing 18 mounted thereon for combining with an external fixed body (not shown in the drawings) to ensure free rotation of the input shaft 10.

The output assembly 30 comprises a transmission sleeve 31 that is made in a stepped form to simultaneously correspond to the input shaft 10 and the detection sleeve 15, wherein the transmission sleeve 31 is rotatably sleeved on the detection sleeve 15 of the input shaft 10, and at least one first one-way bearing 32 is arranged between the transmission sleeve 31 and the detection sleeve 15, wherein the first one-way bearing 32 is operable for driving in a forward direction, while idling in a backward direction. Further, a bearing 34 is arranged between the transmission sleeve 31 and the input shaft 10 to ensure stableness and smoothness of rotation of the transmission sleeve 31. Further, the transmission sleeve 31 is provided thereon with a second outside bearing 35 for combining with the external fixed body (not shown in the drawings) to ensure free rotation of the transmission sleeve 31. Further, the transmission sleeve 31 is formed, on an outside of an opposite end thereof, with an output section 311. The output section 311 can be an engagement toothed portion, which may receive a driven member (not shown in the drawings) to be mounted thereto, such as a sprocket of a bicycle for driving the bicycle by means of a chain.

Further, the assisting power assembly 40 is operable, according to the torque value and the rotating speed value of the input shaft 10, output an assisting power of a corresponding level by means of a controller driving member (not shown in the drawings) to drive the transmission sleeve 31 of the output assembly 30. The assisting power assembly 40 comprises a power member 41 that is rotatably sleeved on the transmission sleeve 31 of the output assembly 30, and at least one second one-way bearing 42 is arranged between an inner circumference of the power member 41 and the transmission sleeve 31. The second one-way bearing 42 is operable in an operation direction that is opposite to that of the first one-way bearing 32, such as the second one-way bearing 42 being idling in the forward direction, while operable for driving in the backward direction.

The wireless detection device 50 is mounted on the detection sleeve 15 of the input shaft 10. The wireless detection device 50 comprises a stationary member 51 and a linked-up member 55, wherein the stationary member 51 is fixedly mounted on the fixed body (not shown in the drawings) to connect to an electrical loop, and the stationary member 51 is provided with a primary winding 52 (primary side) mounted thereon. Further, the stationary member 51 is provided with an optical grating sensing member 53, while the linked-up member 55 is fixed on the detection sleeve 15 and is synchronously rotatable with the detection sleeve 15. Further, the linked-up member 55 is provided with a secondary winding 56 (secondary side) mounted thereon and corresponding to the primary winding 52 of the stationary member 51, so that the secondary winding 56 of the linked-up member 55 is rotatable relative to the primary winding 52 of the stationary member 51 for cutting of magnetic force lines to allow the secondary winding 56 of the linked-up member 55 to generate electrical energy in a wireless manner. Further, the linked-up member 55 comprises a series of equally spaced induction portions 57 mounted thereon around a concentric axis of and corresponding to the optical grating sensing member 53 of the stationary member 51, so that the linked-up member 55 is operable through synchronous rotation of the detection sleeve 15 and the input shaft 10 to conduct measurement of the rotating speed of the input shaft 10 by means of the induction portions 57 of the linked-up member 55 relative to the optical grating sensing member 53 of the stationary member 51 and to generate a strain signal corresponding, in magnitude, to the rotating speed value. The linked-up member 55 is electrically connected to a control circuit 58, so that the control circuit 58 may wirelessly transmit a control signal according to the stain signal (such as for switching to an external force driving mode) to operate a driving member (such as a motor) to make the power member 41 of the assisting power assembly 40 outputting an assisting power toward the transmission sleeve 31 of the output assembly 30.

As such, by means of wireless electricity generation induced with the oppositely arranged primary winding 52 and secondary winding 56 between the stationary member 51 and the linked-up member 55 of the wireless detection device 50, the control circuit 58 of the linked-up member 55 may convert a torque value and a rotating speed value into a strain signal and makes wireless transmission of a control signal, to allow the assisting power assembly 40 to supply, according to the torque value and the rotating speed value of the input shaft 10, an assisting power of a corresponding level to the output assembly 30. And, as such, a power-output wireless torque detection mechanism is established.

In an actual operation of the arrangement of the power-output wireless torque detection mechanism according to the present invention, as shown in FIGS. 1 and 4, when the input shaft 10 receives the primary power from at least one of the two ends thereof, such as for the input shaft 10 being a bicycle crank axle, the primary power being input through pedaling the crank arms on two sides, the input shaft 10 drives, by means of the detection sleeve 15, through the first one-way bearing 32, the transmission sleeve 31 of the output assembly 30 so as to have the transmission sleeve 31 driven by the primary power; and the transmission sleeve 31 makes idling rotation with respect to the power member 41 by means of the second one-way bearing 42 mounted on an outer circumference thereof to prevent driving the controller driving member in an opposite direction to cause damage thereto. Meanwhile, the wireless detection device 50 uses an induction phenomenon between the primary winding 52 and the secondary winding 56 of the stationary member 51 and the linked-up member 55 that is linked to and rotated with the detection sleeve 15 to generate electricity in a wireless manner to supply to the control circuit 58 of the wireless detection device 50 and also measures the torque value and the rotating speed value of the detection sleeve 15 of the input shaft 10 to issue a corresponding strain signal to the controller (not shown in the drawings) to allow the controller to determine whether a preset value is exceeded or not. If the strain signal of the input shaft 10 does not reach a preset value for activating the assisting power assembly 40, the power member 41 of the assisting power assembly 40 is kept in a standstill condition, so that idling rotation is induced between the transmission sleeve 31 of the output assembly 30 and the power member 41 of the assisting power assembly 40 by means of the arrangement of the second one-way bearing 42, and thus not operating the controller driving member (not shown in the drawings), such as a motor, in meshing engagement with the power member 41 of the assisting power assembly 40, to thereby avoid damage to the driving member.

Figure 5:
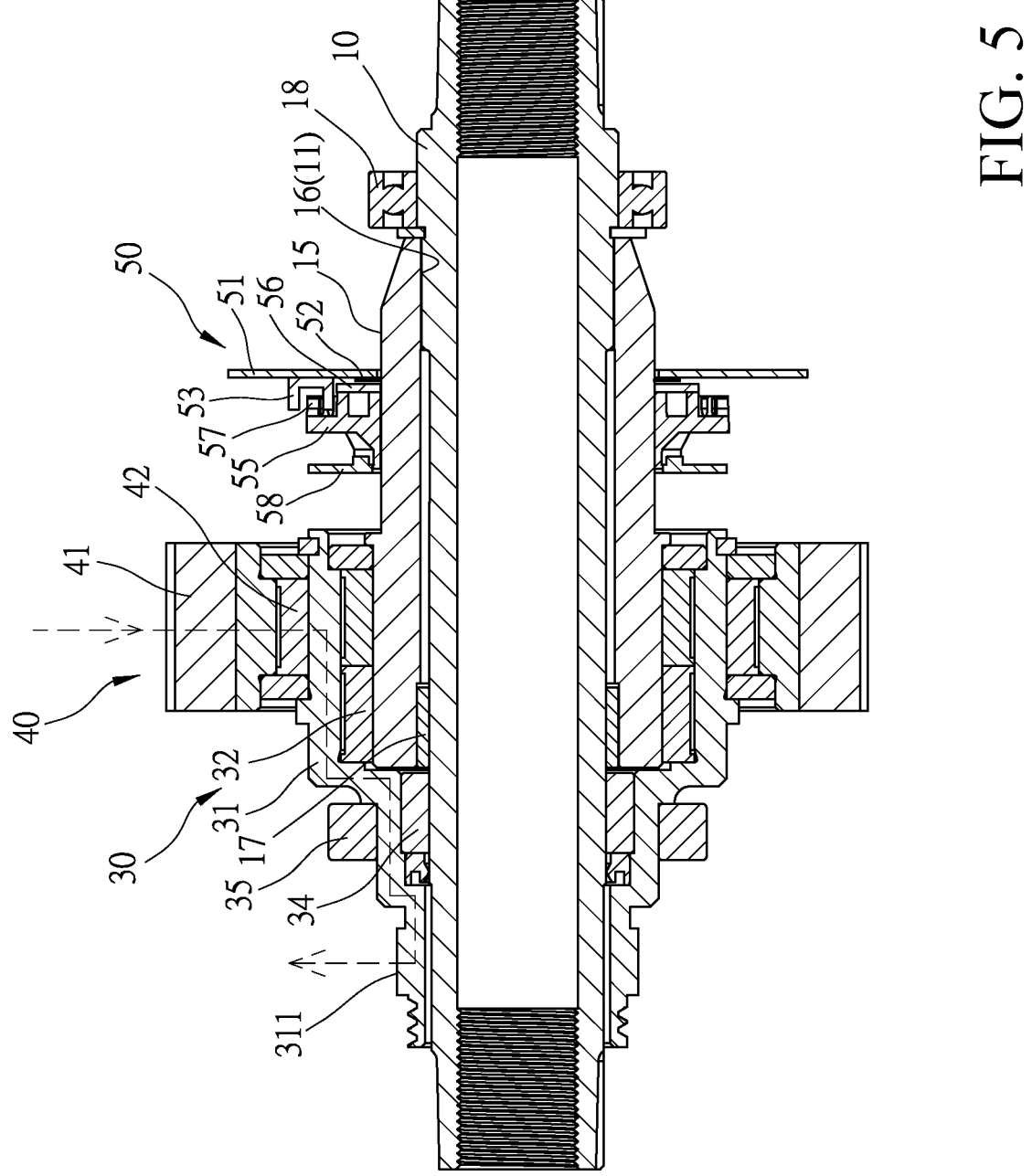
FIG. 5 is a cross-sectional view showing operation with assisting power according to the present invention.

As shown in FIGS. 4 and 5, when the torque value of the input shaft 10 as being driven by the primary power becomes increased, with the rotating speed value being slowed down (such as riding a bicycle upslope), to reach the preset value of the controller, or alternatively, an attempt is made to allow the driving member to operate directly, the controller activates the driving member thereof that is in meshing engagement with the power member 41 of the assisting power assembly 40 and the assisting power assembly 40 outputs a corresponding assisting power, so that the power member 41 drives, by means of the second one-way bearing 42, the transmission sleeve 31 of the output assembly 30 to rotate; and due to the arrangement of the first one-way bearing 32 between the transmission sleeve 31 of the output assembly 30 and the detection sleeve 15, idling rotation is induced between the two so as to prevent the primary power transmitted through the input shaft 10 and the assisting power transmitted through the power member 41 of the assisting power assembly 40 from interfering with each other.

Based on the previous design and illustration, the power-output wireless torque detection mechanism according to the present invention can use the arrangement of the wireless detection device 50 to supply electricity in a wireless manner to allow the control circuit 58 of the linked-up member 55 to detect the torque value and the rotating speed value of the detection sleeve 15 of the input shaft 10 and to transmit the strain signal in a wireless manner to drive the assisting power assembly 40 to supply, according to the torque value and the rotating speed value of the input shaft 10, an assisting power to the output assembly 30 to thereby achieve an effect of wireless supply of power and to accurately detect the torque value and the rotating speed value, and to make the detected signal stabilized and effectively transmitted in a wireless manner, in order to prevent noise interference or incorrectness resulting from signal deterioration during wireless transmission.

Also, a modalized structure is achieved for easy assembling or servicing and battery replacement, which is required by the known devices, is no longer needed, so as to ensure correctness of signal transmission and to achieve an effect of easy assembling and servicing to thereby reduce, in an insensible way, the costs of assembling and servicing. And, in a use in for example a power-assisted bicycle to detect variations of a torque and a rotating speed of a rotating axle, reliable and correct output can be made in a wireless manner, to allow a subsequent input of an assisting power to be conducted in a more timely and more accurate manner to thereby avoid situations of delayed movement or rushing movement.

I claim:

1. A power-output wireless torque detection mechanism, comprising:

an input shaft, which is rotatably mounted to a fixed body, the input shaft being drivable by at least a primary power to rotate; and a wireless detection device, which is arranged on the input shaft, the wireless detection device comprising a stationary member fixed to the fixed body and a linked-up member arranged on the input shaft, wherein the stationary member is provided with a primary winding mounted thereon, and the stationary member is provided with an optical grating sensing member mounted thereon, and the linked-up member is provided thereon with a secondary winding corresponding to the primary winding, so that the secondary winding of the linked-up member is operable to generate electrical energy, and the linked-up member is provided with a series of equally-spaced induction portions around a concentric axis corresponding to the optical grating sensing member of the stationary member, and the linked-up member is electrically connected to a control circuit to detect a torque value of the input shaft and to generate, according to the torque value, a strain signal corresponding thereto and transmittable in a wireless manner.

2. The power-output wireless torque detection mechanism according to claim 1, wherein one side of the input shaft that is opposite to the wireless detection device is provided with an output assembly, and the output assembly comprises a transmission sleeve rotatably sleeved on the input shaft, at least one first one-way bearing being arranged between the transmission sleeve and the input shaft, and wherein an assisting power assembly is sleeved over the output assembly, and the assisting power assembly comprises a power member rotatably sleeved on the transmission sleeve, at least one second one-way bearing being arranged between an inner circumference of the power member and the transmission sleeve, the second one-way bearing being operable in direction that is opposite to a direction of operation of the first one-way bearing, wherein the assisting power assembly is operable to supply, according to the torque value of the input shaft detected by the wireless detection device, an assisting power of a corresponding level to the output assembly to assistingly drive the transmission sleeve of the output assembly.

3. The power-output wireless torque detection mechanism according to claim 2, wherein the input shaft is provided thereon with a detection sleeve movable therewith and the output assembly and the wireless detection device are arranged on the detection sleeve.

4. The power-output wireless torque detection mechanism according to claim 3, wherein one end of the input shaft is formed with an engagement toothed section, and one end of the detection sleeve that corresponds to the engagement toothed section of the input shaft is formed with a counterpart engagement toothed section, in order to have the detection sleeve in meshing engagement with the input shaft and synchronously rotatable therewith, and further, a bearing is arranged between an opposite end of the detection sleeve and the input shaft to ensure the detection sleeve reflect a torque value between the input shaft and the output assembly.

5. The power-output wireless torque detection mechanism according to claim 2, wherein one end of the transmission sleeve of the output assembly is formed with an output section, and the output section comprises an engagement toothed portion for assembling with a driven member.

6. A bicycle, comprising a vehicle body comprising a crank axle structure that comprises the power-output wireless torque detection mechanism according to claim 2.

7. A bicycle, comprising a vehicle body comprising a crank axle structure that comprises the power-output wireless torque detection mechanism according to claim 1.

\* \* \* \* \*